United States Patent [19]
Weaver

[11] 3,986,485
[45] Oct. 19, 1976

[54] ROCKER ARM SHAFTS

[75] Inventor: Dewey E. Weaver, Washington, Ind.

[73] Assignee: Lawrence Peska Associates, Inc., New York, N.Y.; a part interest

[22] Filed: Aug. 20, 1975

[21] Appl. No.: 606,331

[52] U.S. Cl. .......................... 123/90.42; 123/90.39; 123/90.41; 123/90.47
[51] Int. Cl.² ....................................... F01L 1/18
[58] Field of Search ............. 123/90.39, 90.4, 90.41, 123/90.42, 90.47

[56] References Cited
UNITED STATES PATENTS

| | | | |
|---|---|---|---|
| 2,849,996 | 9/1958 | Lee | 123/90.47 |
| 2,865,691 | 12/1958 | Muller | 123/90.39 |
| 3,139,872 | 7/1964 | Thompson | 123/90.41 |
| 3,198,183 | 8/1965 | Ball | 123/90.42 |
| 3,251,350 | 5/1966 | Thompson | 123/90.41 |
| 3,274,983 | 9/1966 | Herring | 123/90.42 |
| 3,407,792 | 10/1968 | Buchwald | 123/90.42 |
| 3,614,943 | 6/1970 | Schley | 123/90.42 |
| 3,621,823 | 11/1971 | Lombardi | 123/90.42 |

Primary Examiner—Charles J. Myhre
Assistant Examiner—Daniel J. O'Connor

[57] ABSTRACT

Novel rocker arm shafts and rocker arm assemblies employing such shafts are disclosed for aligning a plurality of rocker arms and shafts that are individually removable from and attachable to a base such as an engine block. Rocker arms mounted on the shaft can be taken out of the rocker arm assembly without having to remove the entire shaft and the other rocker arms in the assembly. The rocker arm shafts are of a length to mount one rocker arm and the ends of the rocker arm are attachable to one another so that when assembled the shafts can be locked rigidly together and each bolted to an engine block. Insertion of the individual rocker arm shafts and rocker arms into a rocker arm assembly, unlike the prior art individually mounted rocker arms, provides exact alignment of the rocker arm with respect to push rods and valves since the joining of the inserted shaft to the other shaft or shafts in the assembly and the bolting of each shaft to an engine block is used to align the shaft being inserted and the rocker arm mounted thereon.

5 Claims, 3 Drawing Figures

ROCKER ARM SHAFTS

SUMMARY OF THE INVENTION

The present invention relates to a rocker arm assembly and rocker arm shafts for aligning a plurality of rocker arms that are individually removable from and attachable to a base such as an engine block. The shafts comprise a plurality of horizontal bar members, rocker arm members mounted on each of the bars for operatively engaging push rods and valves in a known manner. The rocker arms have securing members or sections therein for rotatably receiving and holding the horizontal bar members transverse to the rocker arms. The horizontal bars extend beyond the securing members or sections on the rocker arms and have members at the ends for horizontally attaching and locking the bars to one another in a common axial plane. Each bar is affixed to a base such as an engine block by a single fastening member so that the alignment of the bars when they are locked to one another and the fastening of such bars to the base or engine block by the fasteners aligns the rocker arms or arm on the bar so that the rocker arm or arms can operatively engage push rod and valve members. Each bar may be removed from the assembly with its rocker arm and be re-inserted without having to disassemble the entire rocker arm assembly. On reinsertion of the bar and rocker arm it may be aligned readily by locking it to at least one of the other bars in the assembly and securing it to the base or engine block through the individual fasteners that are securable to pre-arranged fastener securing positions on the base. Unlike the prior art individually inserted and removable rocker arms, the apparatus of the present invention is self-aligning in addition to being readily inserted and removed from a rocker arm assembly. The prior art single rocker arm assemblies have to be aligned when inserted.

DETAILED DESCRIPTION

Rocker arms for internal combustion engines have been designed to be attached to or removed from an engine block individually as opposed to an earlier design in which the rocker arms were assembled on a shaft, positioned with respect to one another and attached to the engine block as a whole. The latter design was inconvenient where a single rocker arm had to be removed for inspection and subsequent replacement since this entailed removal of the entire rocker arm shaft assembly which had to be disassembled and reassembled. The use of the rocker arm shaft however is a convenient way to align the rocker arms carried thereon for proper operational engagement with the push-rods and valves in an internal combustion engine. Individually replaceable rocker arms provide a convenient design for insertion and removal of rocker arms; however, these rocker arms have to be aligned when installed, unlike those installed as a group of rocker arms on a single rocker arm shaft. U.S. Pat. No. 3,251,350 Thompson teaches a single rocker arm on a rocker arm shaft; however, the shaft, like the individual so-called concave type rocker arms described in U.S. Pat. No. 3,289,657 Winter, have to be aligned for proper engagement with valves and push rods operatively engaged by such rocker arms.

It is therefor an object of the present invention to overcome these and other difficulties encountered in the prior art.

It is a further object of the present invention to provide a novel rocker arm shaft and rocker arm assembly that can be attached to or removed from an engine block individually without having to disassemble and reassemble a plurality of rocker arms mounted on a single rocker arm shaft.

It is a further object of the present invention to provide a novel rocker arm shaft and a rocker arm assembly that can be easily removed individually from an engine block and easily attached to an engine block wherein the rocker arm shaft and rocker arm assembly are self aligning with respect to valves and pushrods when attached to the block.

These and other objects have been achieved according to the present invention and will become apparent from the disclosure and claims that follow as well as the appended drawing.

Figure 1:
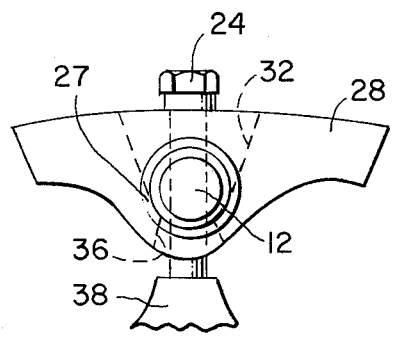
FIG. 1 illustrates a side elevation partially in section of a rocker arm shaft and rocker arm assembly according to one embodiment of the present invention.
Figure 2:
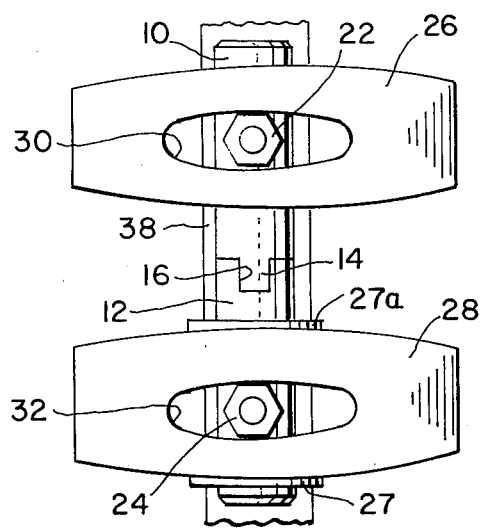
FIG. 2 is a plan view of the rocker arm shaft and rocker arm assembly illustrated in FIG. 1.
Figure 3:
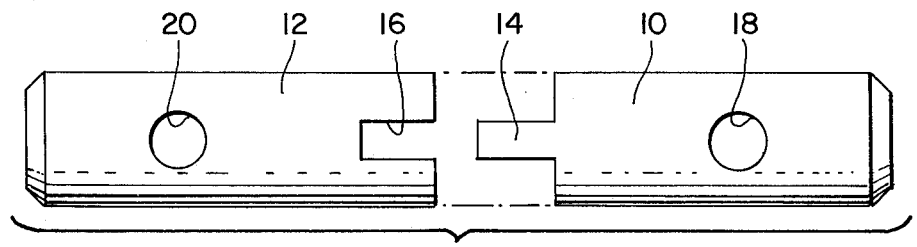
FIG. 3 is a plan view of the rocker arm shaft according to one embodiment of the present invention.

Referring to FIGS. 1 through 3, horizontal bars comprising rocker arm shafts 10 and 12 having bar engaging members at the ends thereof comprising tongue 14 and groove 16 are provided for horizontally attaching and locking the rocker arm shafts to one another in a common axial plane especially a vertical axial plane for vertical insertion and removal of the rocker arm shafts 10 and 12 on base 38. Each rocker arm shaft has a single fastener such as bolt 22 and bolt 24 for affixing bars 10 and 12 through holes 18 and 20 respectively to base 38, the base in one embodiment of the invention comprising an engine block. Rocker arms 26 and 28 are mounted on rocker arm shafts 10 and 12 respectively for operatively engaging push rods and valves in an engine block. The rocker arms have openings for securing the rocker arm shafts thereto and such openings are referred to herein as securing members for rotatably receiving and holding rocker arm shafts 10 and 12 transverse to rocker arms 26 and 28 these openings in rocker arms 26 and 28 comprising concave bearing seats in the rocker arms the arc of which has an axis transverse to the bearing seat and common to the axis of the rocker arm shafts 10 and 12. Rocker arm shafts 10 and 12 in turn have arcuate bearing surfaces for rotatably engaging the bearing seats or arcuate openings in rocker arms 26 and 28.

Lubricant reservoirs 30 and 32 are provided in the tops of rocker arms 26 and 28 for receiving and dispensing lubricant to the rocker arm shafts 10 and 12. A lubricant effluent opening is provided in the bottom of the rocker arms as illustrated in FIG. 1 showing lubricant opening 36. Retaining washers such as washers 27 and 27a are also provided for holding the rocker arms on the shafts and to prevent lateral movement thereon in one embodiment.

In use the rocker arm shaft and rocker arm assembly having rocker arm 26 mounted thereon comprising shaft 10 is bolted to base 38 by means of bolt 22. Rocker arm shaft 12 having rocker arm 28 mounted thereon is then joined to shaft 10 through tongue and groove members 14 and 16 on shafts 10 and 12 respectively. The holes in block 38 for screwingly receiving bolts 22 and 24 are arranged so that when shafts 10 and 12 are secured thereto the rocker arms 26 and 28 will be aligned according to an arrangement whereby each will operatively engage push rods and valves in proper alignment. Shafts 10 and 12 are locked into horizontal alignment with one another when joined and accordingly because rocker arms 26 and 28 are also in a fixed position on these shafts they in turn will be aligned when the shafts are joined and bolted to the base 38. A rocker arm assembly such as shaft 10 and arm 26 may be removed from the base 38 and reinserted by joining the tongue 14 in shaft 10 to the groove 16 in shaft 12. Rocker arm shaft 10 and arm 26 do not have to be aligned, since shaft 10 is joined to shaft 12 and then bolted by means of bolt 22 to base 38, the shaft and arm will be in a pre-determined alignment. Two or more of such shaft members such as shaft 10 and rocker arm members such as arm 26 are used to form an assembly according to the present invention or a plurality of shafts or shafts and rocker arms, the principle of the invention requiring at least two of such units for the self aligning feature to be operative, although in its simplest form the invention comprises one of said shafts and one of said shafts in combination with a rocker arm.

One of the advantages of the present invention is that the push rods that are mounted in push rod channels in the engine block do not have to be ground to fine tolerances so that there is a minimum clearance between the push rod and the wall of such channels as was the case with the single rocker arm members of the prior art Thompson and Winter patents, these fine tolerances being necessary to maintain the proper alignment of the rocker arm in relation to the pushrods. The pushrod channels in an engine block employing the novel apparatus of the present invention may be bored out to allow freer movement of the pushrod therein which eliminates a precision machining step in the manufacture of engine blocks and also eliminates a source of friction since the clearance between the wall of the push rod channel and the side of the push rod can be greater than in similar prior art engine blocks.

Although the invention has been described by reference to some embodiments it is not intended that the novel rocker arm shaft and rocker arm shaft assembly be limited thereby but that certain modifications thereof are intended to be included as falling within the broad scope and spirit of the foregoing disclosure the following claims and the appended drawing.

What is claimed is:

1. A rocker arm assembly for aligning a plurality of rocker arms that are individually removable from and attachable to a base comprising a plurality of horizontal bar means, rocker arm means mounted on each of said horizontal bar means for operatively engaging push rods and valves said rocker arm means having securing means for rotatably receiving and holding said horizontal bar means transverse to said rocker arm means, each of said horizontal bar means extending horizontally beyond said securing means, bar engaging means at the ends of said horizontal bar means for horizontally attaching and locking said bar means to one another in a common axial plane, single fastener means for affixing each bar to a base.

2. The rocker arm assembly of claim 1 where said securing means for rotatably receiving and holding said horizontal bar means transverse to said rocker arm means comprises concave bearing seat means in said rocker arm means having an arc whose axis is transverse to said bearing seat and is common to the axis of said horizontal rod means, said horizontal bar means having arcuate bearing surfaces for rotatably engaging said bearing seats.

3. The rocker arm assembly of claim 1 where said bar engaging means comprises tongue means and groove means opposite each other at the ends of said horizontal bar means, said tongue and said groove lying in a vertical plane so that each horizontal bar means having rocker arm means mounted thereon may be vertically inserted into and removed from said rocker arm assembly.

4. The rocker arm assembly of claim 3 comprising retaining means for preventing said rocker arm means from laterally moving on said horizontal bar means.

5. The rocker arm assembly of claim 3 where said retaining means comprises retaining washer means mounted on and secured to said horizontal bar means and slidingly abutting both sides of said rocker arm means.

* * * * *